Dec. 9, 1924. 1,518,762
H. L. TANNER
GYROSCOPIC COMPASS
Filed Aug. 3, 1922 2 Sheets-Sheet 2
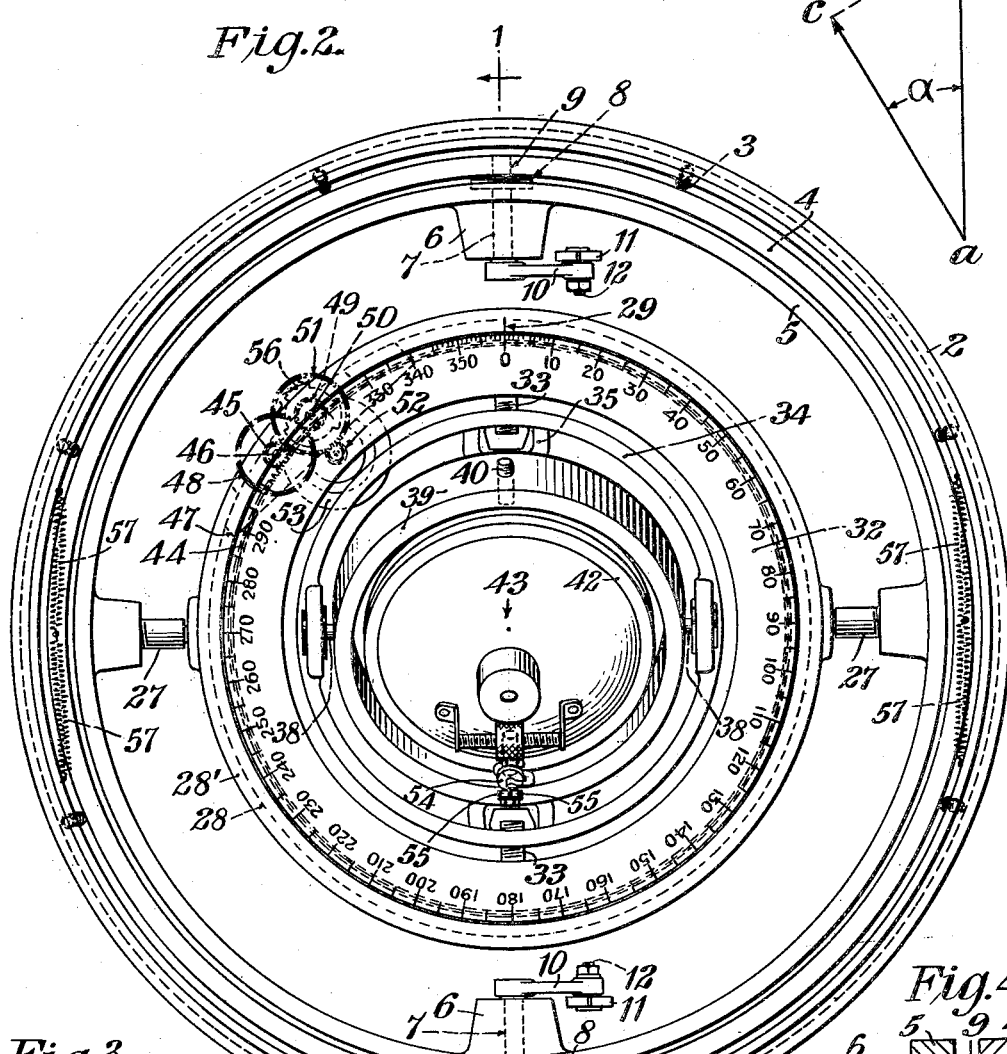
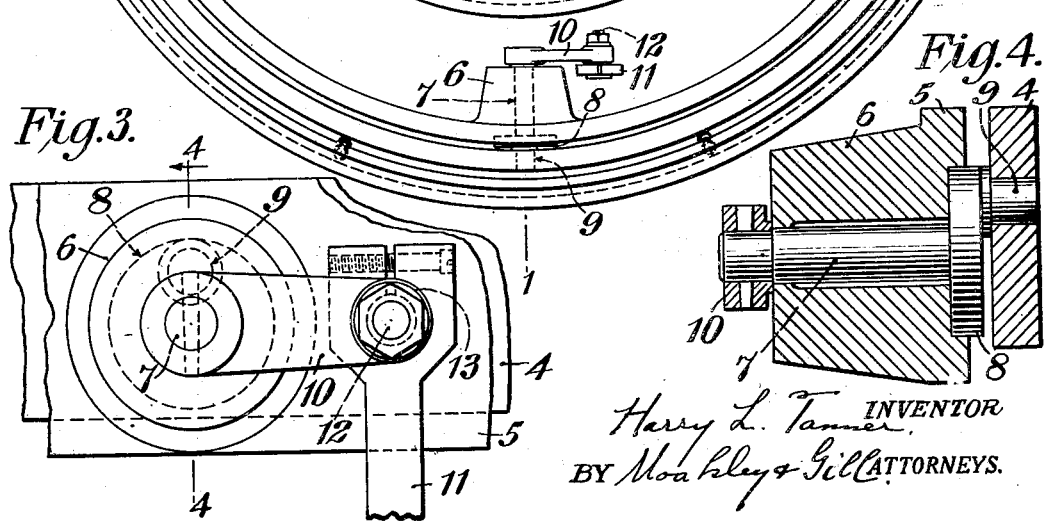

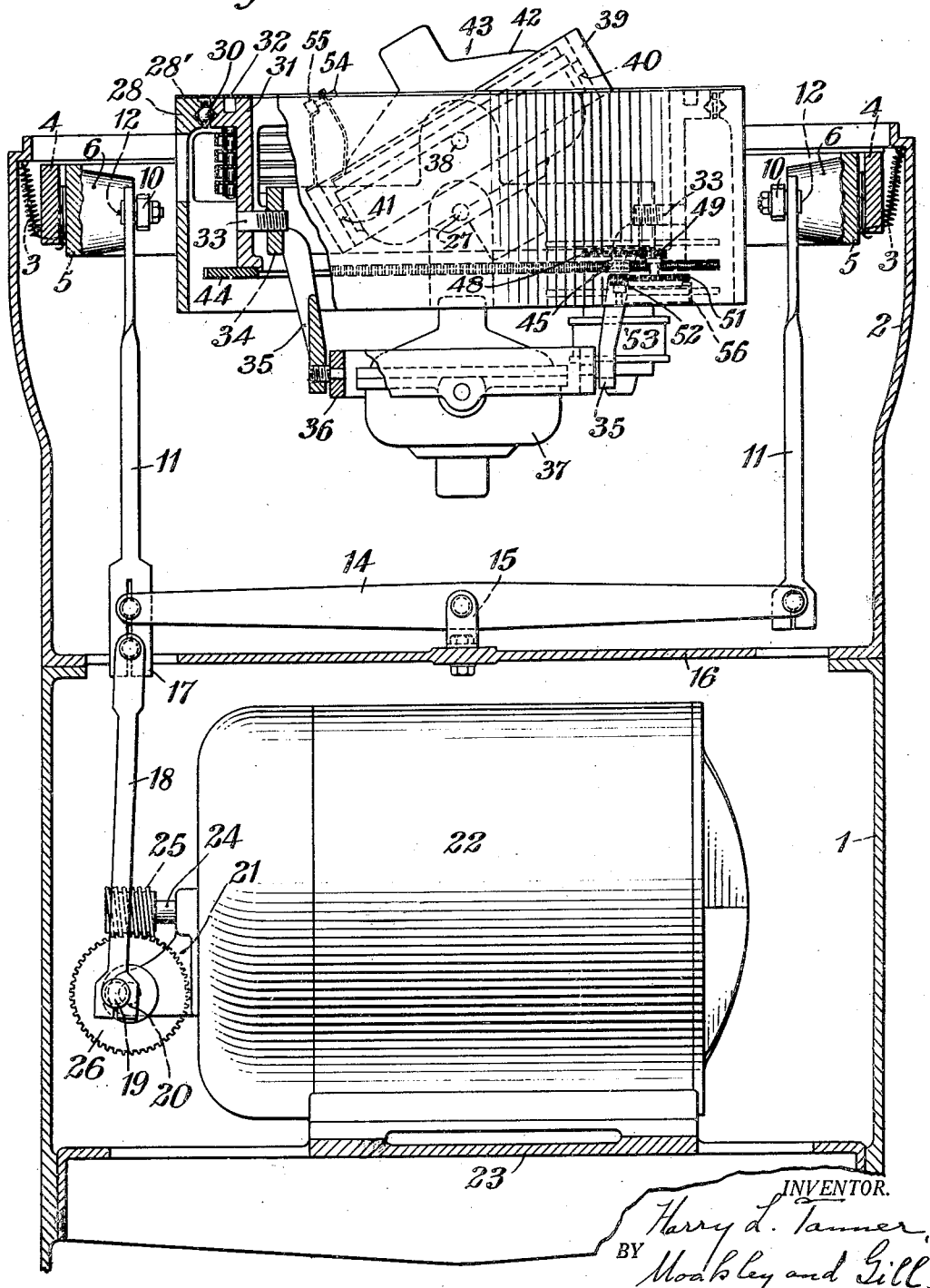

Patented Dec. 9, 1924.

1,518,762

UNITED STATES PATENT OFFICE.

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK.

GYROSCOPIC COMPASS.

Application filed August 3, 1922. Serial No. 579,522.

*To all whom it may concern:*

Be it known that I, HARRY L. TANNER, a citizen of the United States of America, residing at Brooklyn, in the county of Kings, State of New York, have invented certain new and useful Improvements in Gyroscopic Compasses; and I do hereby declare the following to be a full, clear, and exact description of the invention, such as will enable others skilled in the art to which it appertains to make and use the same.

This invention relates to gyroscopic compasses and particularly to arrangements for maintaining the bearings of the gyroscopic element, about which precessional movements take place, in a sensitive condition in order to lessen the opposition to these movements and thereby render the instrument more sensitive and accurate in its operation. Another feature of the invention resides in the provision of a mounting for the electrical apparatus of the compass whereby the structure will be more compact and the use of separate apparatus will be avoided.

In the types of gyroscopic compass at present in use, a gyroscopic element consisting of a rotatable mass mounted within a surrounding case is suspended from a power driven element by means of a filament, a mercury float arrangement or some equivalent device. The element upon which the gyroscopic element is mounted carries the compass card and is arranged to be moved in azimuth by means of a motor controlled by a device consisting of a contact member associated with the gyroscopic element and movable therewith about the supporting axis of the element. This contact member cooperates with a pair of contact members associated with the power driven element, the arrangement being such that upon relative movement in azimuth between the gyroscopic element and the craft, due to a change in course, the movable contact member will engage one or the other of the contact members of the pair to energize the motor and cause the power driven element to move with the gyroscopic element and therefore be displaced with respect to the lubber's line to indicate the new course, the lubber's line being placed upon a part of the instrument which is fixed with respect to the craft.

It is customary in compasses of this type to arrange the contacts for controlling the motor in such a manner that during the normal operation of the instrument the motor will, in addition to the movement which it imparts to the power driven element, cause a continuous oscillation of slight amplitude between the gyroscopic element and the power driven element, thereby maintaining the bearings by which the gyroscopic element is supported upon the power driven element in a sensitive condition, so that upon a relative movement between these elements the friction that might otherwise exist in the bearings and impede such movement is to a great extent overcome.

In compasses of the general type described above in which this hunting action, as it is usually called, takes place, it is produced by the motor which causes the power driven element to follow the movement of the gyroscopic element. This arrangement possesses certain disadvantages, which, as will more clearly hereinafter appear, it is an object of the present invention to avoid. Among these disadvantages is the difficulty of maintaining uniform frequency and amplitude of oscillations due to the two functions which the motor is required to perform. Due to the hunting there is a continuous relative movement between the compass card element and the element which bears the lubber's line, and since any relative movement between these elements is sent to the repeater compasses by the transmitter associated with the master compass, a similar oscillatory movement will take place between the compass card elements and the lubber's line elements of the repeater compasses. While it is claimed in some cases that this oscillatory movement at the repeater compasses is an advantage as it gives an indication of the proper operation of the master compass, in many cases it is a distinct disadvantage as it interferes with the ease and accuracy with which the repeater compasses may be read, and under ordinary conditions of navigation the continual yawing of the craft, even when on a steady course, will be sufficient to show that the compass system is operating properly.

In order to overcome these and other disadvantages attending the use of the motor which drives the power driven element of the compass for the additional purpose of producing oscillations of the bearings, the present invention provides a mechanism independent of the motor for producing the oscillations between the elements of the compass necessary to lessen the friction at the bearings of the gyroscopic element. Due to the use of an independent means for producing the oscillations a uniform frequency and amplitude of the oscillations may be easily secured without causing a relative movement between the compass card element and the lubber's line element, since the oscillations may be imparted to some other elements of the compass than those between which the motor of the power driven element produces a relative movement. The oscillations may also be made more nearly sinusoidal. Since there are no oscillations between the compass card element and the lubber's line element there will be no oscillations transmitted to the dials of the repeater compasses and accordingly the latter may be more conveniently and accurately read.

Another advantage of the invention resides in the fact that oscillations of larger amplitude may be imparted to the elements of the compass than is possible when such oscillations are caused by a relative movement between the compass card and lubber's line elements, for such oscillations of greater amplitude would interfere with reading both the master compass and the repeater compasses operated therefrom.

A further advantage of the invention resides in the fact that the motor for driving the power driven element may have a higher gear ratio than can be given to it when it is also employed for oscillating the bearings. On account of this increased gear ratio more torque is available for moving the compass card element with a given size of motor. The increased gear ratio also gives to the motor a period of oscillation which is relatively long as compared with the period of the mechanism which produces the oscillations of the bearings, so that any tendency of the latter to impress its period upon the former and thereby produce an oscillatory movement between the compass card and lubber's line elements is avoided. By suitable adjustment of the period of the motor which drives the power driven element as compared with the period of the motor or other device which produces the oscillations a slight relative oscillatory movement between the compass card and lubber's line elements may be obtained in case it is desired for any purpose, such as giving indications at the repeater compasses of the proper operation of the compass system.

In practically all gyroscopic compasses at present in use the gyroscopic element is in the form of an electric motor, usually of the induction type in which the stator forms the case of the instrument and the rotor, the wheel or gyroscope. The induction motor is supplied with polyphase current usually generated by a motor generator or equivalent device driven from the power supply of the craft upon which the compass is mounted.

In order to produce a more compact arrangement and to save the space occupied by the motor generator, as well as to lessen the number of conductors between the motor generator and the compass, the present invention includes the provision of a motor generator within the pedestal of the gyroscopic compass, and in order to reduce the number of electrical devices to a minimum the motor of the motor generator is also employed for imparting to the elements of the gyroscopic compass the oscillations required to maintain its bearings in a sensitive condition, although it will be understood that if desired, a motor independent of the motor generator may be employed for this purpose.

While the invention is of general application to all forms of gyroscopic compasses, it is for purpose of illustration shown herein in connection with a compass of the general type shown in my copending application Serial No. 469,201, filed May 13, 1921.

In the accompanying drawings illustrating such an application of the invention—

Fig. 1 is an elevation, partly in section, of the upper part of the pedestal of the instrument showing the motor generator and gyroscopic compass mounted therein.

Fig. 2 is a view of the top of the instrument.

Fig. 3 is a detail view on an enlarged scale showing a part of one of the mechanisms by which oscillations are imparted to the bearings.

Fig. 4 is a view in section along the line 4—4 of Fig. 3 and

Fig. 5 is a vector diagram relating to the operation of the instrument.

In the drawings, 1 represents the pedestal of the instrument which as here shown is provided with a bowl 2 from the top of which is suspended by means of springs 3, an outer gimbal ring 4 within which is an inner gimbal ring 5 within which is mounted a gyroscopic compass of the type shown in my copending application referred to above.

Instead of a simple trunnion connection between the inner and outer gimbal rings as in my said application, the inner gimbal ring is, in accordance with the present invention, provided with a pair of diametrically opposite projections 6 lying in the north-south axis of the instrument as shown most clearly in Fig. 2. Extending through each of these projections and the inner gimbal ring is a shaft 7 provided at its outer end with a disc 8 having an eccentrically disposed crank pin 9 extending into a bearing in the outer gimbal ring 4.

The inner end of each shaft 7 carries a crank 10 to the outer end of which a link 11 is detachably secured by means of a stud 12 clamped between the forked end of the link and extending through a suitable bearing 13 in the arm. The lower ends of the two links 11 are connected to opposite ends of a cross bar 14 pivoted at its center to a bracket 15 attached to a partition 16 within the pedestal 1 of the instrument. One of the links 11 is extended as at 17 and to this extended portion is connected the upper end of a link 18, the lower end of which is connected to a crank pin 19 on a shaft 20 mounted in a bracket 21 attached to the end of a motor generator 22 driven from the power circuits of the ship for supplying the alternating current required for driving the gyroscopes of the instrument and which, in accordance with the present invention, is mounted within the pedestal 1 upon a shelf or partition 23. The shaft 24 of the motor generator is extended and provided with a worm 25 meshing with a gear 26 on the end of the shaft 20.

Mounted within the inner gimbal ring 5 upon trunnions 27, 27 is an outer frame or shell 28 carrying a ring 28' which bears the lubber's line 29 of the compass and within which is mounted by means of balls 30 an inner frame or shell 31 bearing the compass card 32 adapted to cooperate with the lubber's line in giving the indications of the compass. The inner frame is provided with trunnions 33 lying in the north-south plane and upon which is mounted a stabilized ring 34 which, as shown most clearly in Fig. 1, is provided with depending brackets 35 disposed in the north-south plane and carrying at their lower ends a ring 36 within which is mounted a stabilizing gyroscope 37 having its rotor axis substantially vertical.

Mounted within the stabilized ring 34 upon trunnions 38 is an inner ring 39 within which is mounted upon bearings 40 and 41 the case 42 of the main gyroscope 43 consisting of the rotor of an induction motor mounted within the case which carries the stator of the motor. The gyroscopic element and its supporting ring 39 are mounted in an inclined position as shown most clearly in Fig. 1 by displacing its trunnion axis 38—38 from the center of gravity of the element so that the latter is pendulous and maintains a predetermined inclination α to the surface of the earth, which in the present case is substantially 30°.

Attached to the bottom of the inner frame 31 is a gear 44 which is engaged by a pinion 45 mounted on a shaft 46 which is mounted within a frame 47 attached to the outer frame 28. The shaft 46 carries a gear 48 which meshes with a pinion 49 on a second shaft 50 which carries a gear 51 engaging a pinion 52 on the shaft of a servo motor 53, the circuit of which is controlled by a contact device consisting of a contact 54 mounted on the case 42 of the gyroscope and adapted to engage one or the other of two contacts 55 mounted upon ring 39 to cause the servo motor to rotate in one direction or the other. For simplicity, the circuit connections between the contact device and the motor have been omitted.

For transmitting the indications of the compass to repeater compasses the shaft 50 is employed for actuating a transmitter 56 of any suitable construction, which since it forms no part of the present invention is shown merely in outline as of the step-by-step type.

In the operation of the instrument, if the course of the craft be changed the resulting movement in azimuth of the outer frame 28 will tend to carry along the inner frame 31 and the rings 34 and 39 mounted thereon. As the ring 39 moves it will turn the case 42 about the inclined axis of the rotor and will itself be slightly tilted about the axis 40—41 from its normal position with respect to the plane of the case, due to the fact that the trunnions 38—38, by which it is connected to the stabilized ring 34, move in a horizontal plane while the case moves in an inclined plane. This change in the relative position of the case 42 and ring 39 will cause a displacement of the contacts 54 and 55 from their neutral position with respect to each other in a direction to cause the servo motor 53 to be energized to turn the inner frame 31 in the reverse direction to that in which it tends to turn by the movement imparted to the outer frame 28 by the change in the course of the craft. This reverse movement of the element 31 will turn the ring 39 and case 42 until the contacts 44 and 45 are brought back to their neutral position with respect to each other. The instrument will operate in the manner described above whenever there is any yaw of the craft. The servo motor will always maintain the compass card in its true position with respect to the points of the compass, while the outer frame 28 which bears the lubber's line 29 will turn about the interior parts of the instrument in accordance with the movement of the craft. At the same time the transmitter 56 will transmit to the repeater compasses an indication of the relative movement between the outer and inner frames, or in other words, the relative movement of the compass card 32 with respect to the lubber's line 29.

The actuation of the motor generator 22 will, in addition to supplying alternating current for the main and stabilizing gyroscopes, produce through the worm 25, gear 26, shaft 20, crank 19, and link 18 an oscillation of the cross bar 14, the amplitude of which will depend upon the proportioning of the various elements through which movement is transmitted to the bar. The oscillations of the bar will, through the links 11, 11 produce a rocking movement of the shafts 7, thereby producing a relative movement in azimuth between the outer and inner gimbal rings 4 and 5 due to the eccentric connection between these rings formed by the crank pins 9.

In order to cause this relative movement between the gimbal rings to take the form of an actual movement of the inner ring 5 with respect to the fixed parts of the instrument, the movement of the outer gimbal ring is preferably restrained by means of springs 57 attached at their ends to the top of the pedestal and at their centers to the outer gimbal ring 4 as shown most clearly in Fig. 2. Instead of the springs 57 any other suitable arrangement may be employed for restraining the outer gimbal ring in case its inertia is insufficient to prevent it from moving under the influence of the crank pin 9. The springs 57, however, possess the advantage of yielding slightly at the limits of the oscillations, thus lessening the shocks upon the instrument when the direction of movement of the inner gimbal ring changes.

The oscillatory movement thus imparted to the inner gimbal ring 5 will be transmitted through the trunnions 27 to the outer frame 28 and inner frame 32, due to the friction between these frames and the locking effect of the servo motor. The movement imparted to the inner frame 32 will then be transmitted through the trunnions 33 to the stabilized ring 34 and then through the trunnions 38 to the inclined ring 39.

The resultant effect upon the gyroscope of the oscillatory movement imparted to the ring 39 may be explained with the aid of the vector diagram of Fig. 5. In this diagram the vector $a$—$b$ represents in magnitude the amplitude of the oscillations in a horizontal plane, or in other words, the amplitude of the oscillations imparted to the ring 39 through its trunnions 38. A vector $a$—$c$ is laid off with respect to the vector $a$—$b$ at an angle $\alpha$ corresponding to the inclination of the gyroscope. From the point $b$, a third vector $b$—$c$ is laid off at right angles to the vector $a$—$c$. The length of the vector $a$—$c$ then represents in magnitude the amplitude of the movement of the case 42 about the inclined axis of the rotor, and the vector $c$—$b$ represents in magnitude the relative movement between the case 42 and the inclined ring 39, this relative movement being in the form of a continuous oscillation of the case about its axis 40—41, thus maintaining the bearings of this axis in a sensitive condition, thereby reducing the friction which they oppose to the precessional movement of the case with respect to the ring 39 which occurs during the operation of the instrument. Since this oscillatory movement is produced by a source independent of the servo motor 53, the latter is relieved of the function of oscillating the bearings and its own period of oscillation may be lengthened or even entirely eliminated. The servo motor may thus be given a higher gear ratio, thereby increasing the torque available for moving the elements actuated by the motor with a given size of motor.

The increased period of the servo motor may be produced by suitable proportioning of the ratio of the gears by which it is connected to the inner frame 32 or by increasing the inertia of the armature of the motor. The first arrangement is preferred as it gives, in addition to the longer period, a greater toqrue, and at the same time causes the motor to operate at sufficient speed to cause the moving elements of the instrument to respond quickly to changes in course of the craft.

The transmitter 56 will reproduce in the repeater compasses any oscillatory movements between the compass card 32 and the lubber's line 29, but the amplitude of these oscillations may be reduced or even eliminated so that in the repeater compasses there is, at the most, only a slight hunting action between their indicating elements. In all cases, however, the period of oscillation of the servo motor should be relatively long as compared to the period of oscillation imparted to the elements of the instrument by the connection to the motor generator to prevent the latter period from being impressed upon the servo motor, which would result in relative oscillations between the compass card element and the lubber's line element, and render the instrument open to one of the objections which the present invention overcomes.

While an application of the invention to a particular form of compass has been disclosed, it will be understood that it is equally applicable to other forms and that in any case various changes may be made in the details of construction without departing from the principle of the invention as defined in the appended claims.

I claim:

1. In a gyroscopic compass having a gyroscopic element provided with bearings for mounting it upon a power-driven element adapted to be moved by a motor controlled by a contact device, the combination of mechanism independent of the motor for continuously oscillating the bearings of the gyroscopic element.

2. In a gyroscopic compass having a gyroscopic element provided with bearings for mounting it upon a power-driven element adapted to be moved by a motor controlled by a contact device, the combination of a second motor for continuously oscillating the bearings of the gyroscopic element.

3. In a gyroscopic compass having an electrically-driven gyroscopic element provided with bearings for mounting it upon a power-driven element adapted to be moved in azimuth by a motor controlled by a contact device, the combination of electrical mechanism for supplying current to the gyroscopic element and means actuated by the mechanism for continuously oscillating the bearings of the gyroscopic element.

4. In a gyroscopic compass having an electrically-driven gyroscopic element provided with bearings for mounting it upon a power-driven element adapted to be moved in azimuth by a motor controlled by a contact device, the combination of a second motor, a generator driven by the second motor for supplying current to the gyroscopic element and means actuated by the second motor for continuously oscillating the bearings of the gyroscopic element.

5. In a gyroscopic compass having an electrically-driven gyroscopic element mounted upon a movable element supported upon a pedestal, the combination of electrical mechanism mounted within the pedestal for supplying current to the gyroscopic element and agitating said movable element.

6. In a gyroscopic compass having an electrically-driven gyroscopic element mounted upon a power driven element supported upon a pedestal, the combination of a motor generator mounted within the pedestal for supplying current to the gyroscopic element and mechanism for agitating said power driven element.

7. In a gyroscopic compass having an electrically-driven gyroscopic element provided with bearings for mounting it upon a power-driven element supported upon a pedestal and which is arrar ̄ :d to be moved in azimuth by a motor controlled by a contact device, the combination of electrical mechanism mounted within the pedestal for supplying current to the gyroscopic element and means actuated by the mechanism for continuously oscillating the bearings of the gyroscopic element.

8. In a gyroscopic compass having an electrically-driven gyroscopic element provided with bearings for mounting it upon a power-driven element supported upon a pedestal and which is arranged to be moved in azimuth by a motor controlled by a contact device, the combination of a second motor mounted within the pedestal a generator actuated by the second motor for supplying current to the gyroscopic element and means actuated by the second motor for continuously oscillating the bearings of the gyroscopic element.

9. In a gyroscopic compass having a gyroscopic element provided with bearings for mounting it upon a power-driven element supported upon a plurality of gimbal rings and arranged to be moved in azimuth by a motor controlled by a contact device, the combination of mechanism for producing continuous oscillations of one of the gimbal rings to impart continuous oscillations to the bearings of the gyroscopic element.

10. In a gyroscopic compass having a gyroscopic element provided with bearings for mounting it upon a power-driven element supported upon a plurality of gimbal rings and arranged to be moved in azimuth by a motor controlled by a contact device, the combination of a second motor, and eccentric connections between the gimbal rings and means for actuating the said connections from the motor to produce continuous oscillations of one of the gimbal rings to impart continuous oscillations to the bearings of the gyroscopic element.

11. A gyroscopic compass comprising a gyroscopic element, a support for said element including bearings a power driven element on which the gyroscopic element is mounted by said support, a motor for moving the power driven element in azimuth, a member on which the power driven element is mounted, an inner gimbal·ring on which the member is supported, an outer gimbal ring, a support for the outer gimbal ring, a pair of diametrically opposite eccentric connections between the inner and outer gimbal rings and mechanism operatively connected to the eccentric connections for actuating them to produce continuous oscillations in azimuth of the inner gimbal ring to impart continuous oscillations to the bearings of the gyroscopic element.

12. A gyroscopic compass comprising a gyroscopic element, a support for said element including bearings a power driven element on which the gyroscopic element is mounted by said support, a motor for moving the power driven element in azimuth, a member on which the power driven element is mounted, an inner gimbal ring on which the member is supported, an outer gimbal ring, a support for the outer gimbal ring, a pair of diametrically opposite eccentric connections between the inner and outer gimbal rings, a second motor and means operatively connecting the second motor to the eccentric connections for producing continuous oscillations in azimuth of the inner gimbal ring to impart continuous oscillations to the bearings of the gyroscopic element.

13. In a gyroscopic compass, the combination of a gyroscopic element, a support within which the element is mounted upon bearings on an inclined axis, a member within which the support is mounted upon a horizontal axis, a power driven element upon which the member is supported, a member upon which the power driven element is supported, a motor for driving the power driven element, a contact device associated with the gyroscopic element and the support for controlling the motor and means for producing continuous oscillations of the second named member to impart to the gyroscopic element and the support within which it is mounted continuous relative oscillations to maintain the bearings of the element in a sensitive condition.

14. In a gyroscopic compass, the combination of a gyroscopic element, a support within which the element is mounted upon bearings on an inclined axis, a member within which the support is mounted upon a horizontal axis, a power driven element upon which the member is supported, a member upon which the power driven element is supported, a motor for driving the power driven element, a contact device associated with the gyroscopic element and the support for controlling the motor, a second motor and means operatively connecting the second motor to the second named member for producing continuous oscillations of the latter to impart to the gyroscopic element and the support within which it is mounted continuous relative oscillations to maintain the bearings of the element in a sensitive condition.

15. In a gyroscopic compass the combination of a gyroscopic element, an inclined member, bearings for supporting the gyroscopic element upon the inclined member, a member within which the inclined member is mounted upon a horizontal axis, a power driven element upon which the member is mounted, means for supporting the power driven element and means for imparting continuous oscillations to the supporting means to produce continuous oscillations at the bearings between the gyroscopic element and the inclined member.

16. In a gyroscopic compass, the combination of a gyroscopic element including a rotor and a case surrounding the same, a member upon which the case is supported by bearings, a power driven element upon which the member is supported, a motor for moving the element and member to turn the case about the rotor axis while the gyroscopic element is seeking the meridian and means for producing continuous oscillations of the case about the rotor axis to produce continuous oscillations between the case and the member upon which it is supported to maintain the bearings in a sensitive condition.

17. In a gyroscopic compass, the combination of a gyroscopic element including a rotor and a case surrounding the same, a member upon which the case is supported by bearings, contact mechanism consisting of a part associated with the case and a part associated with the member, a motor adapted to be energized when the parts of the mechanism are moved relatively to each other by displacement of the gyroscopic element with respect to its supporting members during meridian seeking movements thereof, connections between the motor and the supporting member for moving the latter to turn the case about the rotor axis to bring the parts of the mechanism into normal relation to each other and means independent of the motor for producing continuous oscillatory displacement of the gyroscopic element with respect to its supporting member to maintain the bearings in a sensitive condition.

18. In a gyroscopic compass, the combination of a gyroscopic element including a rotor and a case surrounding the same, a member upon which the case is supported by bearings, contact mechanism consisting of a part associated with the case and a part associated with the member, a motor adapted to be energized when the parts of the mechanism are moved relatively to each other by displacement of the gyroscopic element with respect to its supporting member during meridian seeking movements thereof, connections between the motor and the supporting member for moving the latter to turn the case about the rotor axis to bring the parts of the mechanism into normal relation to each other, a second motor and means actuated by the second motor for imparting to the supporting member continuous oscillations to produce continuous oscillatory displacements of the gyroscopic element with respect to said member to maintain the bearings in a sensitive condition.

19. In a gyroscopic compass, the combination of a gyroscopic element, an inner member within which the element is mounted upon bearings, a second member upon which the inner member is mounted, a member movable in azimuth and carrying the second member, a motor for moving the azimuth member, mechanism for controlling the motor comprising a contact element associated with the gyroscopic element and a contact element associated with the inner member and means independent of the motor and operatively connected to the azimuth member for producing continuous oscillations thereof to produce through the said members continuous relative oscillations between the gyroscopic element and the inner member to maintain the bearings of the element in a sensitive condition.

20. In a gyroscopic compass having a gyroscopic element provided with bearings for mounting it upon a power driven element adapted to be moved by a motor controlled by a contact device, the combination of mechanism independent of the motor and having a period of oscillation relatively short as compared with that of the motor for maintaining the bearings of the gyroscopic element in a state of continuous vibration.

In testimony whereof I affix my signature.

HARRY L. TANNER.